United States Patent [19]
Bussey

[11] Patent Number: 6,103,969
[45] Date of Patent: Aug. 15, 2000

[54] SOLAR ENERGY COLLECTOR

[76] Inventor: Clifford Bussey, 191-23 121 Ave., St. Albans, N.Y. 11412

[21] Appl. No.: 09/451,031

[22] Filed: Nov. 29, 1999

[51] Int. Cl.[7] .................................................. H01L 25/00
[52] U.S. Cl. ........................................... 136/244; 136/246
[58] Field of Search ..................................... 136/246, 244

[56] References Cited

U.S. PATENT DOCUMENTS

| | | | |
|---|---|---|---|
| 5,081,049 | 1/1992 | Green et al. | 136/246 |
| 5,575,860 | 11/1996 | Cherney | 136/246 |

*Primary Examiner*—Carroll Dority
*Attorney, Agent, or Firm*—Robert J. Bird

[57] ABSTRACT

A solar energy collector includes a base supporting a modular unit, a flexible mounting pad, and a solar panel turret extending upward from the mounting pad. A water receptacle surrounds the mounting pad. The solar panel turret is generally hemiellipsoidal and is divided into upstanding quadrants inclined away from each other to expose their inner surfaces as well as outer surfaces to light. Both inner and outer surfaces of the turret quadrants are arrayed with solar cells to form a solar panels. The turret is of a convex configuration so that all surfaces are exposed to sunlight when the turret is pointed at the sun. The flexible mounting pad allows the solar panel turret to move through a solid angle in response to the position of the sun to follow the sun. The total surface area of the inner and outer surfaces of the turret is substantially greater than the ground surface area occupied by the device. The base includes a water tank and a water line connected it, and the water receptacle is adapted to collect precipitation for delivery to the water tank. The turret is covered with clear protective coating.

6 Claims, 1 Drawing Sheet

SOLAR ENERGY COLLECTOR

BACKGROUND OF THE INVENTION

This invention relates to solar energy collectors, and more specifically to a solar collector configured for improved space efficiency.

Solar energy collectors typically include a number of solar panels, which in turn include a number of individual solar cells. Various solar collectors are known in the prior art. Conventional wisdom dictates that a solar panel must be oriented to present as much surface area as possible to sunlight, and that the incident sunlight must be normal to the solar panel for maximum effectiveness or efficiency. Whether this is true or not, the practical effect of this thinking is that conventional solar collectors require large areas of land or roof on which to mount them. In other words, according to the prior art, every square foot of exposed solar panel requires a square foot of ground to put it on. This requirement for large area has been a major factor retarding the development of solar energy as a significant power source.

It is an object of this invention to provide a solar energy collector with a ratio of "solar panel surface area" to "required space area" significantly higher than that of solar collectors known in the prior art.

SUMMARY OF THE INVENTION

A solar energy collector according to this invention includes a base supporting a modular unit, a flexible mounting pad, and a solar panel turret extending upward from the mounting pad. A water receptacle surrounds the mounting pad. The solar panel turret is generally hemiellipsoidal and is divided into upstanding quadrants inclined away from each other to expose their inner surfaces as well as outer surfaces to light. Both inner and outer surfaces of the turret quadrants are arrayed with solar cells to form a solar panels. The turret is of a convex configuration so that all surfaces are exposed to sunlight when the turret is pointed at the sun. The flexible mounting pad allows the solar panel turret to move through a solid angle in response to the position of the sun to follow the sun. The total surface area of the inner and outer surfaces of the turret is substantially greater than the ground surface area occupied by the device. The modular unit includes two water tanks and connecting water lines, and the water receptacle is adapted to collect precipitation for delivery to the water tank. The turret is covered with clear protective coating.

DRAWINGS

DESCRIPTION

Figure 1:
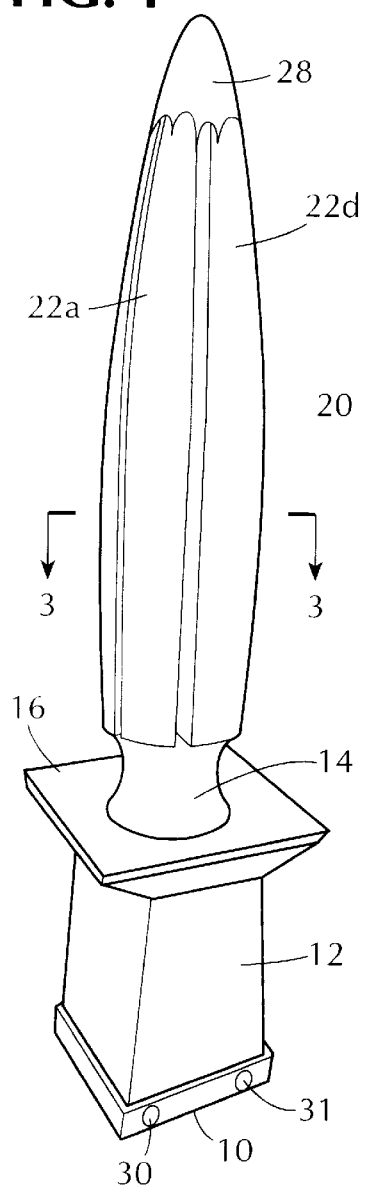
FIG. 1 is a pictorial view of a solar collector of this invention.

Referring to FIG. 1, my solar collector includes a base 10, a water module 12 mounted on the base 10, a flexible mounting pad 14 and surrounding water receptacle 16 both mounted atop the modular unit 12, and a solar panel turret 20 extending upward from the mounting pad 14.

Figure 3:
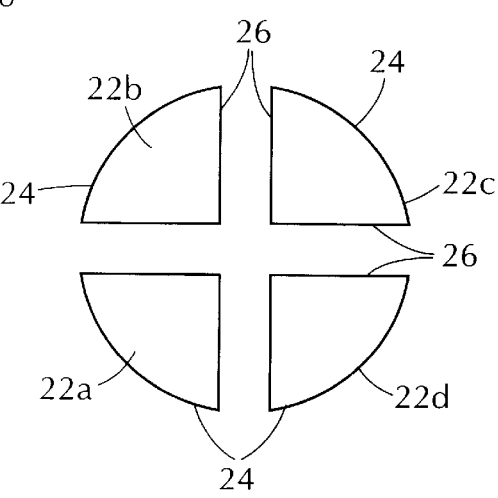
FIG. 3 is a sectional view on the plane 3—3 of FIG. 1.

The solar panel turret 20 is generally hemiellipsoidal. In other words, the upstanding turret is the upper portion of a long narrow ellipsoid. The turret 20 is split lengthwise, as if by two vertical slices along its axis, 90° apart, so that the body of the turret 20 is divided into four quadrants 22a, 22b, 22c, 22d (see also FIG. 3). Each quadrant 22 has a curved exterior surface 24 which is, of course, exposed to light. Each quadrant also has two planar surfaces 26, 90° apart and coplanar with the turret axis, which surfaces 26 are also exposed to light. The surfaces 24 and 26 of all quadrants 22 are arrayed with solar cells. That is to say, each of the surfaces 24 and 26 is a solar panel. The turret 20 is covered with a clear protective coating 28.

Figure 2:
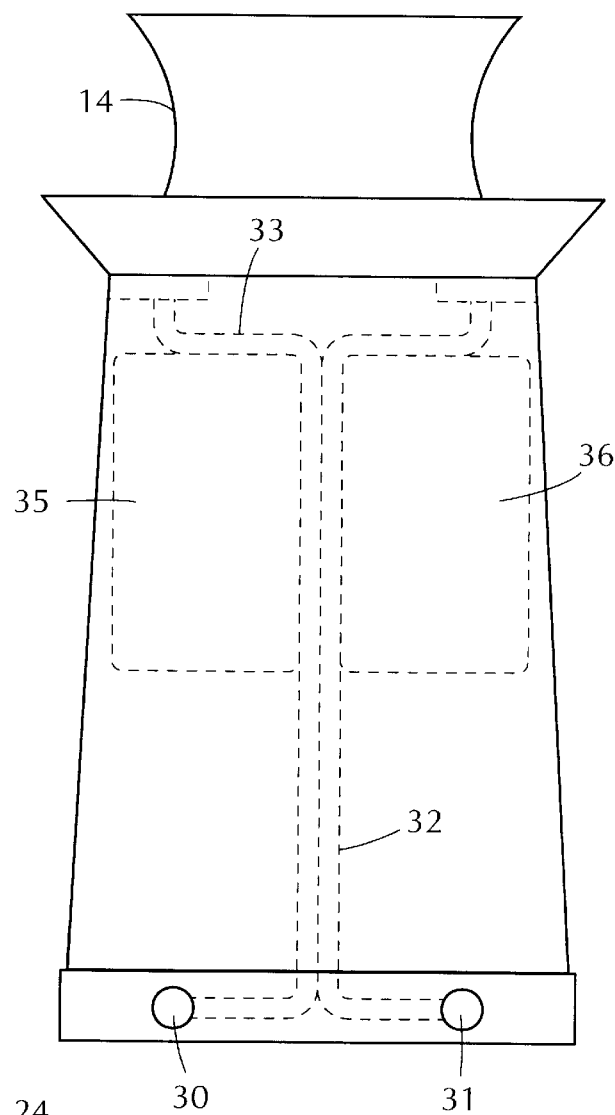
FIG. 2 is an enlarged detail view, partly broken away, of the modular unit from FIG. 1.

Referring to FIG. 2, the base 10 includes water inlet and outlet connections 30, 31 and internal piping 32 to and from hot and cold water tanks 35, 36 mounted in the modular unit 12.

The water receptacle 16 surrounding the mounting pad 14 collects rain and snow for delivery through internal piping 33 to the water tanks 35, 36.

The flexible mounting pad 14 supports the solar panel turret 20 and permits it to sweep "east and west" from horizon to horizon, and "north and south" from horizonal to vertical, through a considerable solid angle. The system includes a microprocessor system with known global positioning technology by which to control the attitude of the turret 20 to follow the sun throughout the day. The system is programmed with its own latitude and longitude information and programmed to track the position of the sun relative to the earth. The turret is of a convex ellipsoidal configuration (rather than straight cylindrical, for example) so that when it is pointed directly at the sun, all of its surfaces (i.e. outer surfaces 24 and inner surfaces 26) are exposed to the sun.

Referring back to FIG. 1, it will be readily seen that with the configuration of this invention, the surface area of exposed solar panels 24, 26 is many times greater than the area required for placement of the base 10.

The foregoing description of a preferred embodiment of this invention, including any dimensions, angles, or proportions, is intended as illustrative. The concept and scope of the invention are limited only by the following claims and equivalents thereof.

What is claimed is:

1. A solar energy collector including a base, a flexible mounting pad supported on said base, and a solar panel turret supported on and extending up from said mounting pad;

said solar panel turret being generally hemiellipsoidal and divided into upstanding sections, said sections being inclined away from each other to expose inner surfaces as well as the outer surfaces thereof to light, said inner and outer surfaces of said turret each arrayed with solar cells to form a solar panel, said turret being of convex configuration whereby all said surfaces are exposed to sunlight when said turret is pointed at the sun;

said flexible mounting pad allowing said solar panel turret to move through a solid angle in response to the sensed position of the sun to follow the sun;

the surface area of said solar panels of said turret being greater than the bottom surface area of said base.

2. A solar energy collector as defined in claim 1, further characterized by:

said base including a water tank and a water line connected thereto, said water receptacle adapted to collect precipitation for delivery to said water tank.

3. A solar energy collector as defined in claim 1, further characterized by said turret covered with clear protective coating.

4. A solar energy collector including a base, a water module on said base, a flexible mounting pad on said water module, a water receptacle surrounding said mounting pad, and a solar panel turret supported on and extending up from said mounting pad;

said solar panel turret being generally hemiellipsoidal and divided into upstanding quadrants, said quadrants being inclined away from each other to expose inner surfaces as well as outer surfaces thereof to light, said inner and outer surfaces of said turret each arrayed with solar cells to form a solar panel, said turret being of convex configuration whereby all said surfaces are exposed to sunlight when said turret is pointed at the sun;

said flexible mounting pad allowing said solar panel turret to move through a solid angle in response to the sensed position of the sun to follow the sun;

the total surface area of said inner and outer surfaces of said turret being greater than the bottom surface area of said base.

5. A solar energy collector as defined in claim 4, further characterized by:

said base including a water tank and a water line connected thereto, said water receptacle adapted to collect precipitation for delivery to said water tank.

6. A solar energy collector as defined in claim 4, further characterized by said turret covered with clear protective coating.

* * * * *